(No Model.)
B. B. MORGAN.
CAR COUPLING.
No. 325,957. Patented Sept. 8, 1885.
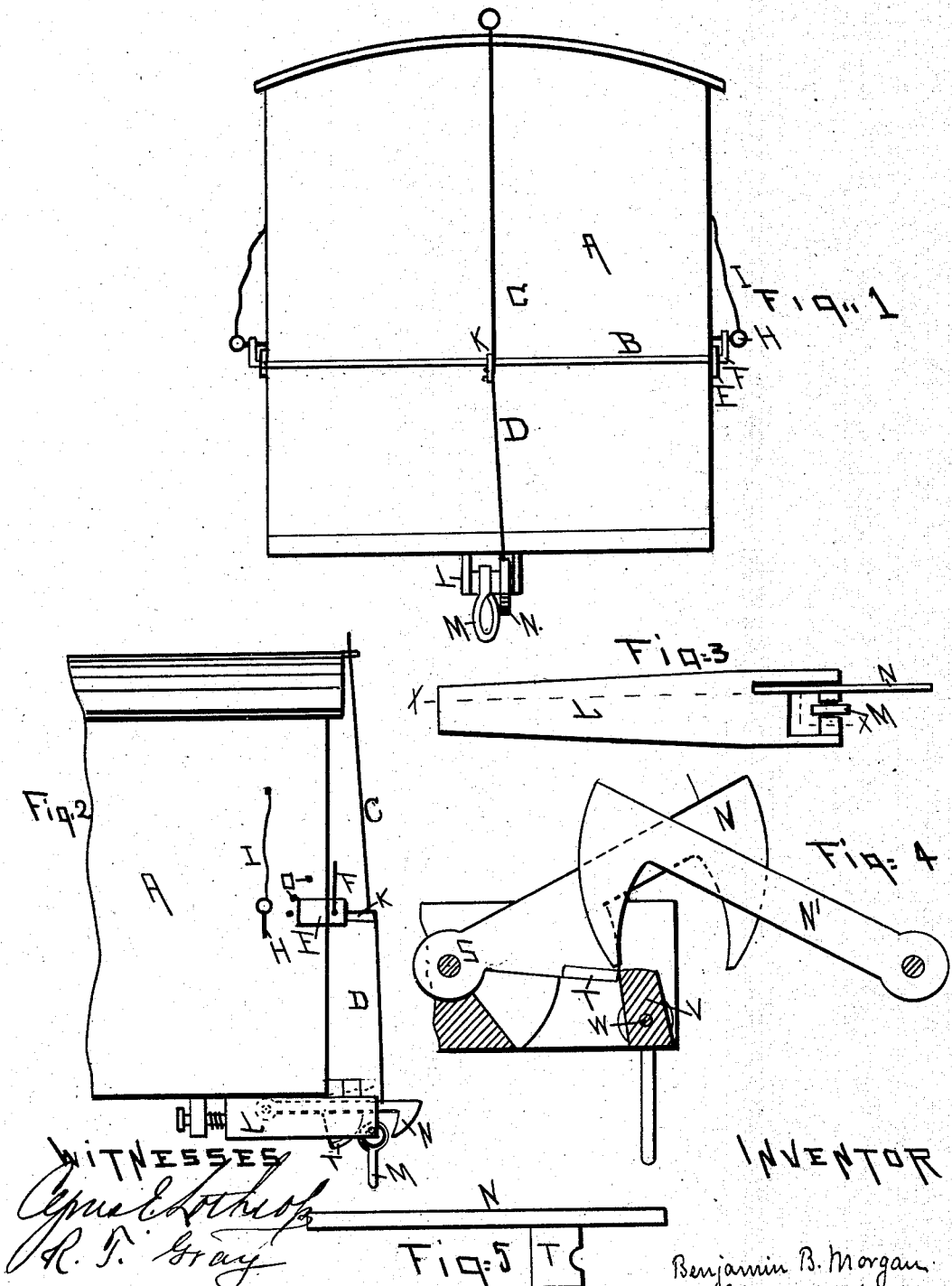

United States Patent Office.

BENJAMIN B. MORGAN, OF ANN ARBOR, MICHIGAN.

CAR-COUPLING.

SPECIFICATION forming part of Letters Patent No. 325,957, dated September 8, 1885.

Application filed July 20, 1885. (No model.)

*To all whom it may concern:*

Be it known that I, BENJAMIN B. MORGAN, of Ann Arbor, in the county of Washtenaw and State of Michigan, have invented a new and useful Improvement in Car-Couplings, of which the following is a specification.

My invention consists in an improvement in car-couplers, hereinafter fully pointed out in the claims.

Figure 1 is an end elevation of the body of a car with my invention attached, and Fig. 2 is a similar side elevation. Fig. 3 is a plan view of the draw-bar. Fig. 4 is a section on the line $x\,x$, Fig. 3. Fig. 5 is a plan view of one of the coupling-hooks detached.

A represents the body of a car. B represents a shaft running across the end of the car-body, journaled in brackets E at the sides of the car, and having both ends bent to form levers F, whereby shaft B can be rocked.

K represents an arm secured to the center of shaft B at an angle with levers F, as shown, though this is not essential.

C represents a connecting-rod provided with a handle at one end above the roof of the car-body, and with its lower end pivoted to the end of K; and D represents a connecting-rod, which connects the end of K with the pivoted coupling-hook N.

L represents a draw-bar, made of either wrought or cast metal, having an opening cut therethrough near its forward end, as shown in Figs. 3 and 4, so as to leave a lug, V, preferably inclined on its rear side, extending across the front of the recess, but not rising the full height of the draw-bar.

N N' represent pivoted coupling-hooks, one of which is pivoted in a recess cut in each draw-bar on one side of the longitudinal center thereof by a strong pin, S, as shown in Figs. 2 and 3.

T represents a toe secured to the shank of each coupling-hook and projecting therefrom under the recess through the draw-bar, and lying below the draw-bar when the hook is at its lowest position, as shown in Fig. 2.

W represents a strong pin, which passes through the lug V of the draw-bar; and M represents a link permanently secured to pin W for use with an ordinary draw-bar, using the well-known link and pin coupling, and hanging down out of the way when not in use, as clearly shown in the drawings.

H represents a stop-pin hung to the car-body by a chain or cord, I, and adapted to enter one of a series of holes, O, in the car-body to retain the lever F in any desired position.

The operation of my invention is as follows: When two cars provided with my improved automatic coupling are to be coupled together, the pivoted coupling-hooks are allowed to lie at their lowest position, in which they are sustained by the shank thereof resting on the top of the lug V in each draw-bar. When the two cars come together, the end of each pivoted hook strikes the outer surface of the lug V in the other draw-bar, and as the face or end of the hook is curved, as shown in the drawings, and the lug V somewhat inclined, each hook rides up over the opposing lug and falls behind the lug, thus coupling the cars firmly together.

When it is desired to uncouple the cars, the hook N is lifted by the connecting-rod D, and this may be done either by means of the levers F, which, when moved, rock shaft B and raise arm K, or by the handle on connecting-rod C. As the hook rises the toe T lifts the hook fastened to the other draw-bar until it clears the lug V, so that both hooks are raised by the act of raising either one, and the cars thus uncoupled. When it is desired to shunt cars without coupling them, the hook in each draw-bar is raised so that it will not engage with another draw-bar, and held in this position by inserting the pin H into one of the holes O, so as to hold the lever F depressed and the arm K and hook N raised.

When it is desired to couple a car provided with my invention to a car using the ordinary link and pin coupling, the coupling-hook N is raised and fastened, as above described, and the coupling is made by using the link M in the ordinary manner.

In the drawings I have shown the toe T as formed of a sheet of metal extending across the recess in the draw-bar; but it is obvious that its form and proportions may be changed at will, and that it will embody the spirit of my invention so long as it is capable of raising the hook in the opposing draw-bar clear from the lug, as above explained.

What I claim as my invention, and desire to secure by Letters Patent, is—

1. A draw-bar having a recess cut therein and a lug across its front end, a swinging hook pivoted in the draw-bar, and a lateral toe, T, connected with the hook and rising in said recess when the hook is raised, substantially as shown and described.

2. A draw-bar having a recess cut therethrough near its front end, a lug extending across the draw-bar in front of said recess, and having both faces inclined toward the rear end of the draw-bar, a hook having a curved end and having its shank pivoted in the draw-bar, a toe connected with said hook, and means for raising said hook, substantially as shown and described.

3. In combination with the draw-bar L, pivoted hook N, having the toe T thereon, connecting-rod D, rock-shaft B, having arm K and lever F thereon, and stop-pin H, substantially as shown and described.

4. The combination of the draw-bar L with the pivoted hook N, toe T, and connecting-rods C D, substantially as shown and described.

5. In combination with the draw-bar L, having the lug V across its front end, the link M, pivoted on the pin W, substantially as shown and described.

BENJAMIN B. MORGAN.

Witnesses:
ALPHEUS FELCH,
JOHN FINNEGAN.